(12) United States Patent
Hori (10) Patent No.: US 10,870,343 B2
(45) Date of Patent: Dec. 22, 2020

(54) VEHICLE DRIVE DEVICE

(71) Applicant: TOYOTA JIDOSHA KABUSHIKI KAISHA, Toyota (JP)

(72) Inventor: Tetsuo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 16/394,030

(22) Filed: Apr. 25, 2019

(65) Prior Publication Data

US 2019/0329642 A1    Oct. 31, 2019

(30) Foreign Application Priority Data

Apr. 25, 2018 (JP) .................... 2018-084512

(51) Int. Cl.
| | |
|---|---|
| *B60K 6/44* | (2007.10) |
| *B60K 6/445* | (2007.10) |
| *B60K 6/365* | (2007.10) |
| *B60K 6/405* | (2007.10) |
| *F16H 37/08* | (2006.01) |
| *F16H 57/037* | (2012.01) |
| *F16H 57/04* | (2010.01) |

(52) U.S. Cl.
CPC ............. *B60K 6/445* (2013.01); *B60K 6/365* (2013.01); *B60K 6/405* (2013.01); *F16H 37/0806* (2013.01); *F16H 57/037* (2013.01); *F16H 57/0457* (2013.01); *B60Y 2200/92* (2013.01)

(58) Field of Classification Search
CPC .... F16H 57/0439; F16H 48/06; F16H 57/037; F16H 57/0452; B60K 6/445
See application file for complete search history.

(56) References Cited

U.S. PATENT DOCUMENTS

| | | | | |
|---|---|---|---|---|
| 8,882,622 | B2 * | 11/2014 | Sada ...................... | B60K 6/445 475/5 |
| 2009/0295242 | A1 * | 12/2009 | Yamamoto ............ | B60K 6/547 310/83 |
| 2011/0180339 | A1 * | 7/2011 | Kawamura ............ | B60L 50/61 180/65.245 |

(Continued)

FOREIGN PATENT DOCUMENTS

| | | |
|---|---|---|
| EP | 3 067 588 A1 | 9/2016 |
| EP | 3 203 120 A1 | 8/2017 |

(Continued)

*Primary Examiner* — Derek D Knight
(74) *Attorney, Agent, or Firm* — Oliff PLC (57) ABSTRACT

A vehicle drive device including a generator rotationally driven to generate electric power by an engine via a planetary gear device, an electric motor operated by using an electric energy obtained by the generator, and a power transmission mechanism transmitting an output of the electric motor to wheels comprises: a housing case including a first housing space; and a lubricating device distributing an oil at least to the power transmission mechanism in the first housing space for lubrication. The planetary gear device and the power transmission mechanism are housed in the first housing space and a sun gear and a carrier of the planetary gear device are coupled to one and the other of the engine and the generator respectively, while a ring gear of the planetary gear device is non-rotatably held by the housing case.

8 Claims, 5 Drawing Sheets

(56) References Cited

U.S. PATENT DOCUMENTS

| | | | | |
|---|---|---|---|---|
| 2013/0017916 A1* | 1/2013 | Sada | ....................... | B60L 50/40 |
| | | | | 475/5 |
| 2013/0283972 A1* | 10/2013 | Yamamoto | .......... | F16H 57/0486 |
| | | | | 74/665 B |
| 2016/0218602 A1* | 7/2016 | Fukushima | ............ | H02K 5/225 |
| 2018/0045090 A1* | 2/2018 | Kiyokami | ................ | F01P 11/08 |
| 2018/0045295 A1* | 2/2018 | Kiyokami | .............. | B60K 6/445 |
| 2018/0080542 A1* | 3/2018 | Sugiyama | ................ | B60K 6/40 |

FOREIGN PATENT DOCUMENTS

| | | | |
|---|---|---|---|
| JP | 2001-138752 A | | 5/2001 |
| JP | 2011-148445 A | | 8/2011 |
| JP | 2017-154684 A | | 9/2017 |

* cited by examiner

VEHICLE DRIVE DEVICE

This application claims priority from Japanese Patent Application No. 2018-084512 filed on Apr. 25, 2018, the disclosure of which is herein incorporated by reference in its entirety.

BACKGROUND OF THE INVENTION

Field of the Invention

The present invention relates to a vehicle drive device and, more particularly, to a vehicle drive device that transmits output of an electric motor to wheels, while the electric motor is operated with an electric energy obtained from a generator rotationally driven by an engine.

Description of the Related Art

There is known a vehicle drive device including (a) a generator rotationally driven to generate electric power by an engine via a planetary gear device, (b) an electric motor operated by using an electric energy obtained by the generator, and (c) a power transmission mechanism transmitting an output of the electric motor to wheels. A device described in Patent Document 1 is an example thereof and has a carrier of a planetary gear device (power dividing mechanism 3) coupled to an engine, a sun gear of the planetary gear device coupled to a generator (first motor 4), a ring gear of the planetary gear device coupled via an output clutch CO to an output gear, and when the sun gear and the carrier are coupled by a series clutch CS, and the output clutch CO is released to disconnect the output gear from the ring gear, a series hybrid mode is established for running with an electric motor (second motor 16) operated with an electric energy obtained by rotationally driving the generator with the engine.

CITATION LIST

Patent Document 1: Japanese Laid-Open Patent Publication No. 2017-154684

SUMMARY OF THE INVENTION

Technical Problem

The planetary gear device and the power transmission mechanism of a vehicle drive device as described above are housed in a common housing space, for example, and oil supplied by an oil pump, scooping-up, etc. is distributed to meshing portions, bearings, etc. of the power transmission mechanism for lubrication. When the planetary gear device is integrally rotated during the series hybrid mode, a distributed state of the oil for the power transmission mechanism becomes unstable due to an air flow generated by the rotation, and a lubrication performance may be impaired.

The present invention was conceived in view of the situations and it is therefore an object of the present invention to prevent a lubrication performance for a power transmission mechanism from becoming unstable due to an air flow generated by rotation of a planetary gear device when a generator is rotationally driven to generate electric power via the planetary gear device by an engine.

Solution to Problem

To achieve the above object, a first aspect of the invention provides a vehicle drive device including (a) a generator rotationally driven to generate electric power by an engine via a planetary gear device, (b) an electric motor operated by using an electric energy obtained by the generator, and (c) a power transmission mechanism transmitting an output of the electric motor to wheels, the vehicle drive device comprising: (d) a housing case including a first housing space; and (e) a lubricating device distributing an oil at least to the power transmission mechanism in the first housing space for lubrication, wherein (f) the planetary gear device and the power transmission mechanism are housed in the first housing space and a sun gear and a carrier of the planetary gear device are coupled to one and the other of the engine and the generator respectively, while a ring gear of the planetary gear device is non-rotatably held by the housing case.

A second aspect of the present invention provides the vehicle drive device recited in the first aspect of the invention, wherein the planetary gear device and the power transmission mechanism are arranged on axes different from each other and overlap at least partially each other in the axial direction. In other words, the power transmission mechanism is arranged such that at least a part of the power transmission mechanism is located radially outward of the planetary gear device.

A third aspect of the present invention provides the vehicle drive device recited in the first or second aspect of the invention, wherein (a) the lubricating device includes an oil storage portion disposed in a lower end portion of the first housing space, and wherein (b) the power transmission mechanism is partially immersed in an oil stored in the oil storage portion, so that the oil scooped up due to rotation of the power transmission mechanism is scattered and distributed to portions of the power transmission mechanism.

A fourth aspect of the present invention provides the vehicle drive device recited in any one of the first to third aspects of the invention, wherein (a) the housing case includes a pair of longitudinal walls disposed at both sides in an axial direction of the planetary gear device to intersect with the axial direction and a cylindrical first outer cylinder wall disposed on an outer circumferential side of the planetary gear device and thereby forms the first housing space, and wherein (b) the ring gear is non-rotatably held by either one or both of the pair of vertical walls.

A fifth aspect of the present invention provides the vehicle drive device recited in any one of the first to third aspects of the invention, wherein (a) the housing case includes a second housing space disposed adjacent to the first housing space across an intermediate partition wall, wherein (b) the generator is housed in the second housing space, and wherein (c) the ring gear is non-rotatably held by the intermediate partition wall.

A sixth aspect of the present invention provides the vehicle drive device recited in the fifth aspect of the invention, wherein (a) a ring gear member on which the ring gear is provided is fixedly non-rotatably held by the intermediate partition wall with spline fitting, wherein (b) the ring gear is a helical gear, and wherein (c) the helical gear has a twisting direction defined such that a thrust load is generated in a direction in which the ring gear member is pressed toward the intermediate partition wall when the generator is rotationally driven by the engine via the planetary gear device.

A seventh aspect of the present invention provides the vehicle drive device recited in the fifth or sixth aspect of the invention, wherein (a) the engine, the planetary gear device, and the generator are disposed on a first axis, wherein (b) the electric motor is disposed on a second axis parallel to the first axis and housed in the second housing space together with the generator, wherein (c) the power transmission mechanism includes a motor output gear disposed on the second axis and rotationally driven by the electric motor and a differential device disposed on a third axis parallel to the second axis, wherein the whole of the power transmission mechanism from the motor output gear to the differential device is housed in the first housing space, and wherein (d) the vehicle drive device is mounted on a vehicle in a posture in which the first axis is substantially parallel to a width direction of the vehicle.

An eighth aspect of the present invention provides the vehicle drive device recited in any one of the fifth to seventh aspects of the invention, wherein (a) the engine, the planetary gear device, and the generator are disposed on a common axis and the planetary gear device is located between the engine and the generator, wherein (b) the housing case includes (b-1) an intermediate case member including a cylindrical second outer cylinder wall and provided with the intermediate partition wall extending from the second outer cylinder wall to the inner circumferential side, (b-2) an engine-side case member integrally fixed to one end portion of the second outer cylinder wall and integrally fixed to the engine to form the first housing space with the intermediate partition wall, and (b-3) a generator-side case member integrally fixed to the other end portion of the second outer cylinder wall to form the second housing space with the intermediate partition wall.

Advantageous Effects of Invention

The vehicle drive device as described above has the sun gear and the carrier of the planetary gear device coupled to one and the other of the engine and the generator respectively, and the ring gear of the planetary gear device non-rotatably held by the housing case, so that when electric power is generated by the generator, the generator is rotationally driven by the engine via the sun gear and the carrier. Therefore, the distribution state of the oil to the power transmission mechanism is prevented from becoming unstable due to an air flow generated by the rotation of the ring gear as in the case of integrally rotating the planetary gear device, and a predetermined lubrication performance is stably obtained. Since the ring gear positioned at an outermost circumferential portion of the planetary gear device is non-rotatably held by the housing case, an air flow generated by the rotation of the pinions, the sun gear, and the carrier disposed on the inner circumferential side relative to the ring gear hardly has an influence, so that the lubrication performance for the power transmission mechanism is more stabilized.

According to the vehicle drive device recited in the second aspect of the invention, the planetary gear device and the power transmission mechanism are arranged on axes different from each other and overlap at least partially each other in the axial direction thereof. In other words, the power transmission mechanism is at least partially disposed on the outer circumferential side of the planetary gear device and is therefore susceptible to the influence of the air flow generated by the rotation of the planetary gear device when the oils are distributed to the power transmission mechanism for lubrication in the case where the planetary gear device is integrally rotated. Since the ring gear of the planetary gear device is held non-rotatably and the influence of the air flow due to the rotation of the planetary gear device is suppressed, so that the lubrication performance is stably obtained when the oils are distributed to the power transmission mechanism for lubrication.

According to the vehicle drive device recited in the third aspect of the invention, the oil storage portion is disposed in the lower end portion of the first housing space housing the planetary gear device and the power transmission mechanism, and a portion of the power transmission mechanism is immersed in the oil storage portion so that the oil scooped up due to the rotation of the power transmission mechanism is scattered and distributed to the portions of the power transmission mechanism. Therefore, when the planetary gear device is integrally rotated, the oil is easily influenced by the air flow generated by the rotation and the distribution state of the oil becomes unstable, so that the lubrication performance may be impaired. In this regard, since the ring gear of the planetary gear device is non-rotatably held and the influence of the air flow due to the rotation of the planetary gear device is suppressed, the distribution state of the scooped-up scattered oil becomes stable so that the lubrication performance is stably obtained when the oils are distributed to the power transmission mechanism for lubrication.

According to the vehicle drive device recited in the fourth aspect of the invention, the first housing space is formed to include the pair of longitudinal walls, disposed on both sides in the axial direction of the planetary gear device and the cylindrical first outer cylinder wall disposed on the outer circumferential side of the planetary gear device, and the ring gear is non-rotatably held by either one or both of the longitudinal walls. Therefore, vibrations in the radial and circumferential directions occurring in the ring gear due to meshing and rotation of the pinions are properly received by the longitudinal wall substantially parallel to the radial direction of the ring gear, and the occurrence of abnormal noises such as gear noises are suppressed as compared to when the ring gear is fixed to the first outer cylinder wall etc.

According to the vehicle drive device recited in the fifth aspect of the invention, the second housing space is disposed adjacent to the first housing space across the intermediate partition wall, and the ring gear is non-rotatably held by the intermediate partition wall. Specifically, the ring gear is non-rotatably held by the intermediate partition wall disposed inside the housing case, and therefore, even when vibrations in the radial, circumferential, and axial directions occurring in the ring gear due to meshing and rotation of the pinions are applied to the intermediate partition wall, the vibrations are not transmitted directly to the outside of the housing case, so that the occurrence of abnormal noises such as gear noises are suppressed as compared to when the ring gear is fixed to the outer cylinder wall etc.

According to the vehicle drive device recited in the sixth aspect of the invention, the ring gear member including the ring gear is fixedly non-rotatably held by the intermediate partition wall with spline fitting, and the ring gear is a helical gear having the twisting direction defined such that a thrust load is generated in the direction in which the ring gear member is pressed toward the intermediate partition wall when the generator is rotationally driven by the engine via the planetary gear device. This can facilitate an operation of installing the ring gear member such that the member is non-rotatably held by the intermediate partition wall. Additionally, the load including the thrust load applied to the ring gear member by meshing and rotation of the pinions is received by the intermediate partition wall inside the housing case, so that the occurrence of abnormal noises caused by vibrations due to the thrust load is also properly suppressed.

According to the vehicle drive device recited in the seventh aspect of the invention, the engine, the planetary gear device, and the generator are disposed on the first axis, and the electric motor is disposed on the second axis and housed in the second housing space together with the generator, while the power transmission mechanism includes the motor output gear disposed on the second axis and the differential device disposed on the third axis, and the whole of the power transmission mechanism from the motor output gear to the differential device is housed in the first housing space. Therefore, the vehicle drive device including the differential device can be formed compact in terms of the dimension in the axial direction of the first axis, and when the vehicle drive device is mounted on the vehicle in a transversely-mounted posture in which the first axis is substantially parallel to the width direction of the vehicle, the vehicle width dimension can be kept relatively small.

According to the vehicle drive device recited in the eighth aspect of the invention, the engine, the planetary gear device, and the generator are disposed on the common axis and the planetary gear device is located between the engine and the generator, and the housing case is formed to include the intermediate case member, the engine-side case member, and the generator-side case member, and this can facilitate operations of assembling the planetary gear device and the power transmission mechanism in the first housing space between the intermediate partition wall of the intermediate case member and the engine-side case member and assembling the ring gear such that the ring gear is non-rotatably held by the intermediate partition wall. This can also facilitate an operation of assembling the generators in the second housing space between the intermediate partition wall of the intermediate case member and the generator-side case member.

DESCRIPTION OF THE PREFERRED EMBODIMENTS

The present invention is applied to a series hybrid type vehicle drive device using an engine only for electric generation, for example, and is configured such that a ring gear of a planetary gear device is fixedly non-rotatably held by a housing case; however, the ring gear may non-rotatably be held at least during a series hybrid mode, and the ring gear may selectively be held non-rotatably by the housing case using a friction engagement device of a hydraulic type, a meshing engagement device, etc. For example, an output gear can be coupled to the ring gear via a connecting/disconnecting device such as a clutch so that the output of the engine is transmitted from the output gear through a power transmission mechanism to wheels. For example, a spline fitting is used as a means for fixedly non-rotatably holding the ring gear by the housing case; however, various fixing means such as press fitting, bolt fastening, and welding can be employed. Even if the ring gear is undetachably non-rotatably fixed to the housing case, for example, the other of the front and rear wheels, which are not driven by the electric motor, can be driven by the engine to achieve a parallel hybrid system in a vehicle as a whole.

For example, the planetary gear device and the power transmission mechanism are arranged on axes different from each other and overlap at least partially each other in the axial direction thereof; however, a portion of the power transmission mechanism may be disposed on the same axis as the planetary gear device. Even though the planetary gear device and the power transmission mechanism do not overlap in the axial direction, an air flow caused by rotation of the planetary gear device may have an influence if the planetary gear device and the power transmission mechanism are arranged close to each other, and the positional relationship between the planetary gear device and the power transmission mechanism can have various forms including the case where the planetary gear device and the power transmission mechanism are arranged on the same axis. The power transmission mechanism is constituted by using a plurality of gears, for example, or can be constituted by using various mechanisms transmitting power using a belt or a chain etc.

The planetary gear device may be a single pinion type or double pinion type device. Gears such as the ring gear of the planetary gear device are preferably helical gears; however, other gears such as a spur gear can also be employed. One and the other of the engine and the generator are coupled to the sun gear and the carrier of the planetary gear device. In other words, one of the engine and the generator may be coupled to the sun gear, and the other may be coupled to the carrier. The engine is an internal combustion engine such as a gasoline engine and a diesel engine generating power from combustion of fuel. For the generator, for example, a motor generator also functioning as an electric motor is used; however, an electric generator dedicated to electric generation may be used. For the electric motor rotationally driving the wheels, for example, a motor generator also functioning as a generator is used; however, an electric motor which does not have a function of a generator may be used.

The lubricating device is configured such that, for example, the oil in the oil storage portion disposed in the lower end portion of the first housing space is scooped up due to rotation of the power transmission mechanism and distributed to the portions of the power transmission mechanism for lubrication; however, the lubricating device may forcibly supply the oil to the power transmission mechanism by a mechanical oil pump or an electric oil pump, and the oil discharged from an opening, a nozzle, etc. disposed in a rotation shaft may be distributed to meshing portions of gears etc. Either one of the scooping-up type supply and the oil-pump type supply may be used, or both of the types may be used together. When the scooping-up type supply is employed, for example, a portion of the power transmission mechanism is always immersed in the oil in the oil storage portion; however, the portion of the power transmission mechanism may be immersed in the oil in a stationary state during stop of the vehicle etc. when fluctuation of an oil level stops, and a lower end of the power transmission mechanism may be at the same height as the oil level when the oil in the oil storage portion decreases during running etc. In the case of the oil-pump supply type, the power transmission mechanism may be located higher than the oil level of the oil. The oil pump is configured to pump up the oil from the oil storage portion, for example, or can be configured to pump up oil from another oil storage portion etc. in the housing case. The first housing space and the second housing space are not necessarily enclosed spaces and may be spaces through which oil etc. can circulate.

The ring gear of the planetary gear device is desirably non-rotatably held by the longitudinal wall forming the first housing space or the intermediate partition wall or can non-rotatably be held by an outer cylinder wall etc. on the outer circumferential side. The generator and the electric motor are desirably housed in the second housing space disposed adjacent to the first housing space across the intermediate partition wall; however, the generator and the electric motor can be housed together with the planetary gear device and the power transmission mechanism in a single housing space of the housing case. A housing space housing the generator and the electric motor can be disposed adjacent to the first housing space on the side opposite to the intermediate partition wall across the first housing space, or the generator and the electric motor can separately be housed in different housing spaces, and various other forms are available.

For example, the vehicle drive device of the present invention is mounted on the vehicle in a transversely-mounted posture in which the first axis is substantially parallel to the width direction of the vehicle; however, the present invention can also be applied to a vehicle drive device mounted on the vehicle in a longitudinally-mounted posture in which the first axis is substantially parallel to the front-rear direction of the vehicle. For example, the engine, the planetary gear device, and the generator are disposed on the common first axis, and the electric motor is disposed on the second axis parallel to the first axis; however, the electric motor can be disposed on the first axis, or the engine, the planetary gear device, and the generator can be disposed on axes different from each other, and various other forms are available. If the engine, the planetary gear device, and the generator are disposed on the common first axis, for example, the engine and the generator are arranged on both sides of the planetary gear device; however, the engine and the generator can adjacently be arranged side by side, and the order of arrangement thereof is determined as appropriate.

The power transmission mechanism transmitting the output of the electric motor to the wheels includes, for example, a differential device distributing the power transmitted from the electric motor to the right and left wheels, and the differential device is disposed on a third axis parallel to the first axis and housed in the first housing space, and at least a portion of the differential device is immersed in the oil in the oil storage portion to scoop up the oil. The differential device can be disposed outside the housing case. Therefore, the whole of the power transmission mechanism may not necessarily be disposed in the first housing space of the housing case, and at least a portion of the power transmission mechanism may be disposed in the first housing space. For example, a housing case housing the generator, the planetary gear device, the electric motor, the motor output gear and a reduction gear of the power transmission mechanism, etc. may be disposed on the vehicle front side, at an intermediate position in the vehicle front-rear direction, etc. for coupling to a differential device on the rear wheel side through a propeller shaft extended to the outside from the housing case.

The housing case is configured to include the intermediate case member, the engine-side case member, and the generator-side case member, for example, or can be made up of two case members depending on an internal divided structure or can be constituted by using four or more case members, and various other forms are available.

Example

An example of the present invention will now be described in detail with reference to the drawings. In the following example, the figures are simplified or deformed as needed and portions are not necessarily precisely drawn in terms of dimension ratio, shape, etc.

Figure 1:
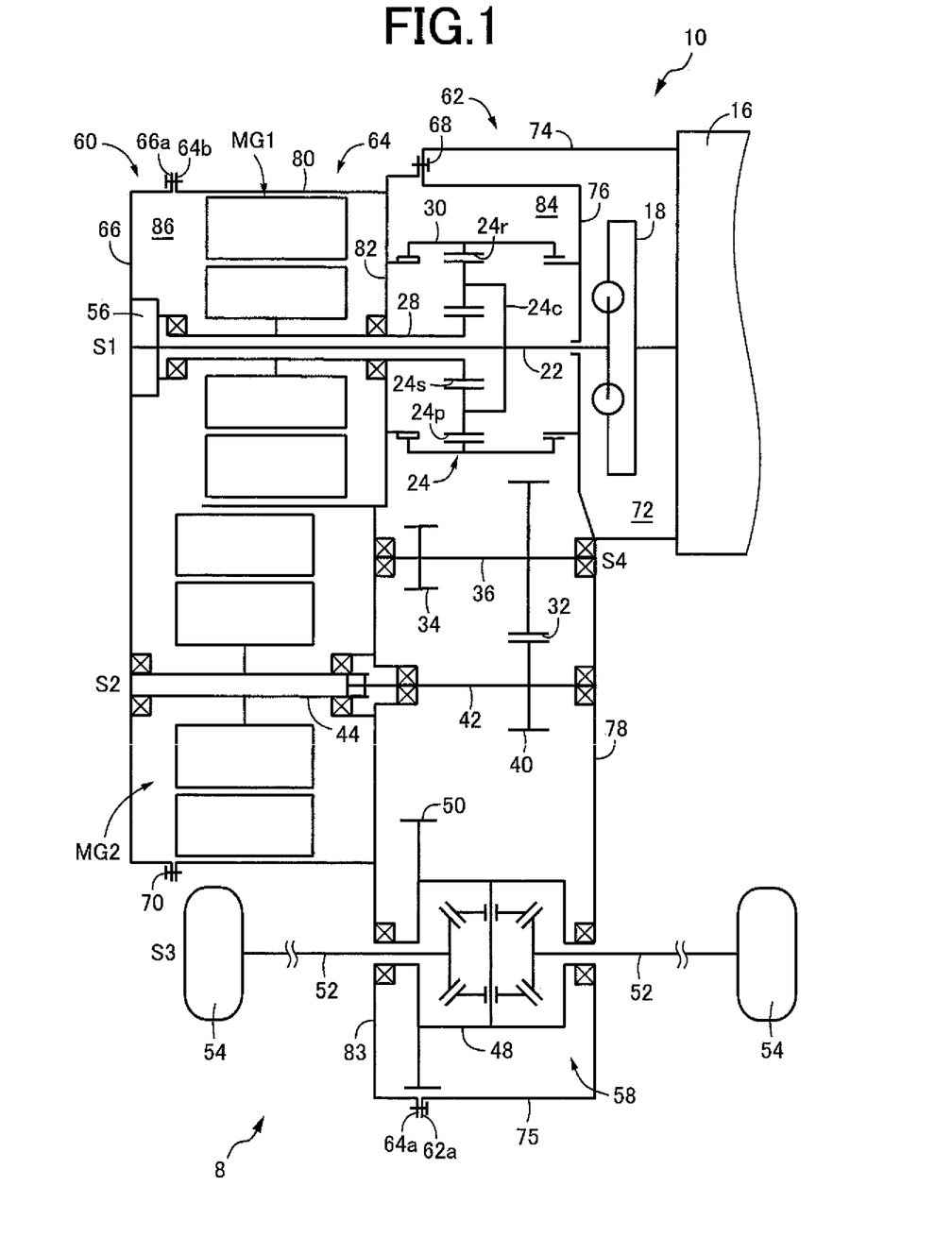
FIG. 1 is a schematic for explaining a vehicle drive device of series hybrid type that is an example of the present invention.

FIG. 1 is a schematic for explaining a vehicle drive device 10 that is an example of the present invention and is a development diagram showing multiple axes constituting the vehicle drive device 10 developed and arranged in a common plane. The vehicle drive device 10 is a transversely-mounted series hybrid type drive device of an FF vehicle etc. in which the multiple axes are arranged along a width direction of a vehicle 8 and includes a first axis S1 to a fourth axis S4 substantially parallel to the vehicle width direction. An input shaft 22 coupled to an engine 16 via a damper device 18 is disposed on the first axis S1, and a single pinion type planetary gear device 24 and a first motor generator MG1 are arranged concentrically with the first axis S1. The input shaft 22 is coupled to a carrier 24c of the planetary gear device 24, and a rotor shaft 28 of the first motor generator MG1 is coupled to a sun gear 24s of the planetary gear device 24. A ring gear member 30 provided with a ring gear 24r of the planetary gear device 24 is non-rotatably held by a housing case 60. Therefore, when the carrier 24c is rotationally driven in one direction via the input shaft 22 by the engine 16, the first motor generator MG1 coupled to the sun gear 24s is rotated at an increased speed in one direction in accordance with a gear ratio $\rho$ (=the number of teeth of the sun gear 24s/the number of teeth of the ring gear 24r). The sun gear 24s and the ring gear 24r are meshed with a plurality of pinions 24p freely rotatably disposed on the carrier 24c. The sun gear 24s, the ring gear 24r, and the plurality of pinions 24p are all made up of helical gears.

The first motor generator MG1 functions as an electric motor and a generator, is mainly used as a generator in this example, and is rotationally driven to generate electric power by the engine 16 via the planetary gear device 24. The engine 16 is an internal combustion engine such as a gasoline engine and a diesel engine generating power from combustion of fuel and, for example, the engine 16 can be cranked and started through power running control of the first motor generator MG1. The input shaft 22 is inserted through an axial center of the first motor generator MG1 and is coupled to a mechanical oil pump 56 so that the oil pump 56 is rotationally driven by the engine 16. The first motor generator MG1 corresponds to a generator of the present invention.

A second motor generator MG2 and a motor output gear 40 are disposed on the second axis S2. The motor output gear 40 is disposed on an output shaft 42, and the output shaft 42 is coupled to a rotor shaft 44 of the second motor generator MG2 by spline fitting in a power transmittable manner. The second motor generator MG2 functions as an electric motor and a generator and is used as a drive power source for running when being subjected to power running control to function as an electric motor. Specifically, the motor output gear 40 rotationally driven by the second motor generator MG2 is meshed with a reduction large gear 32 disposed on a counter shaft 36 on the fourth axis S4, and a reduction small gear 34 disposed on the counter shaft 36 is meshed with a differential ring gear 50 of a differential device 48 disposed on the third axis S3. Therefore, output of the second motor generator MG2 is reduced in speed in accordance with a ratio of the number of teeth between the motor output gear 40 and the reduction large gear 32 and a ratio of the number of teeth between the reduction small gear 34 and the differential ring gear 50 and transmitted to the differential device 48 and is transmitted from the differential device 48 through left and right axles 52 to left and right wheels 54. In this example, the second motor generator MG2 corresponds to an electric motor of the present invention, and a power transmission mechanism 58 transmitting the output of the second motor generator MG2 to the wheels 54 is formed, including the motor output gear 40, the reduction large gear 32, the reduction small gear 34, and the differential device 48. When the second motor generator MG2 is subjected to regenerative control and used as a generator, a braking force can be applied to the wheels 54 during running on a downhill or deceleration running.

The second motor generator MG2 is operated by using an electric energy obtained by the first motor generator MG1 rotationally driven by the engine 16 to generate a drive power. An electric storage device such as a battery is connected via an inverter etc. to the first motor generator MG1 and the second motor generator MG2, so that the electric storage device can be charged with the electric energy obtained through the regenerative control of the first motor generator MG1 and the second motor generator MG2, and the second motor generator MG2 can be operated by using the electric energy of the electric storage device.

The vehicle drive device 10 includes the housing case 60. The housing case 60 is integrally fixed to the engine 16 and is supported by a vehicle body via a bracket etc. The housing case 60 is made up of three members, i.e., a housing 62, an intermediate case member 64, and a rear cover 66, which are integrally fastened by multiplicity of fastening bolts 68, 70 such that butting portions 62a, 64a, 64b, 66a such as flanges disposed at respective axial end portions are butted each other. Specifically, the butting portion 62a of the housing 62 and the butting portion 64a of one opening portion of the intermediate case member 64 are integrally fixed by the multiplicity of fastening bolts 68, and the butting portion 64b of the other opening portion of the intermediate case member 64 and the abutting portion 66a of the rear cover 66 are integrally fixed by the multiplicity of fastening bolts 70. The butting portions 62a, 66a are provided with insertion holes through which the fastening bolts 68, 70 are respectively inserted, and the butting portions 64a, 64b are provided with screw holes into which the fastening bolts 68, 70 are respectively screwed. The housing 62 corresponds to an engine-side case member of the present invention, and the rear cover 66 corresponds to a generator-side case member of the present invention.

The housing 62 is integrally fixed to the engine 16 and forms with the engine 16 a damper housing space 72 housing the damper device 18. Specifically, the housing 62 integrally includes a cylindrical damper-portion outer cylinder wall 74 disposed substantially parallel to the first axis S1 on the outer circumferential side of the damper device 18, a damper partition wall 76 disposed to extend from the damper-portion outer cylinder wall 74 to the inner circumferential side in a posture substantially orthogonal to the first axis S1 to form the damper housing space 72 with the engine 16, and an end surface wall 78 disposed to extend from the damper-portion outer cylinder wall 74 to the outer circumferential side. The housing 62 also includes a cylindrical gear-portion outer cylinder wall 75 extending substantially parallel to the first axis S1 in a direction opposite to the engine 16 from the damper partition wall 76 and an outer circumferential edge of the end surface wall 78. A portion of the damper-portion outer cylinder wall 74 extends parallel to the gear-portion outer cylinder wall 75 in the direction opposite to the engine 16 further than the damper partition wall 76 to form an outer cylinder wall of a double structure.

The intermediate case member 64 includes a cylindrical MG-portion outer cylinder wall 80 disposed substantially parallel to the first axis S1 on the outer circumferential side of the motor generators MG1, MG2, an intermediate partition wall 82 disposed to extend from the MG-portion outer cylinder wall 80 to the inner circumferential side in a posture substantially orthogonal to the first axis S1 to the fourth axis S4, and an end surface wall 83 disposed to extend from the MG-portion outer cylinder wall 80 to the outer circumferential side. A gear housing space 84 housing the planetary gear device 24 and the power transmission mechanism 58 is formed from the intermediate partition wall 82 and the end surface wall 83 to the damper partition wall 76 and the end surface wall 78 of the housing 62. The intermediate partition wall 82 and the end surface walls 78, 83 include support portions rotatably supporting the counter shaft 36, the output shaft 42, and the differential device 48 via bearings. The gear housing space 84 corresponds to a first housing space of the present invention, and the partition walls 76, 82 correspond to a pair of longitudinal walls of the present invention which are disposed at both sides in an axial direction of the planetary gear device 24 in a posture intersecting with the axial direction. The MG-portion outer cylinder wall 80 corresponds to a second outer cylinder wall of the present invention, and the gear-portion outer cylinder wall 75 of the housing 62 corresponds to a first outer cylinder wall of the present invention which is disposed on the outer circumferential side of the planetary gear device 24. The gear-portion outer cylinder wall 75 can be disposed with the intermediate case member 64, and in this case, the gear-portion outer cylinder wall 75 serves as the first outer cylinder and the second outer cylinder wall.

An MG housing space 86 housing the first motor generator MG1 and the second motor generator MG2 is formed between the rear cover 66 and the intermediate partition wall 82. For example, the motor generators MG1, MG2 have stators press-fitted into the MG housing space 86 and positioned concentrically with the axes S1, S2 and fixed to the intermediate partition wall 82 etc. by fastening bolts. The rear cover 66 and the intermediate partition wall 82 include support portions rotatably supporting the rotor shafts 28, 44 via bearings. The MG housing space 86 corresponds to a second housing space of the present invention.

Figure 2:
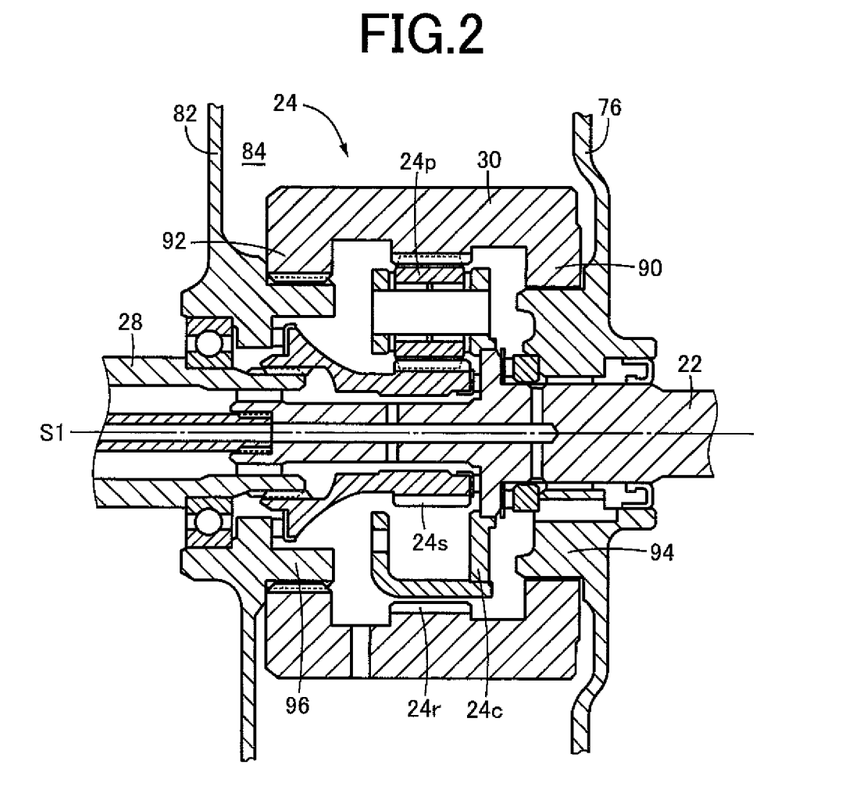
FIG. 2 is a view for specifically explaining a configuration of a planetary gear device included in the vehicle drive device of FIG. 1 and is a cross-sectional view including a first axis S1.

The ring gear member 30 of the planetary gear device 24 is non-rotatably held by the intermediate partition wall 82 of the intermediate case member 64. FIG. 2 is a cross-sectional view parallel to the first axis S1 near the planetary gear device 24, and the planetary gear device 24 is housed in the gear housing space 84 between the partition walls 76 and 82. The ring gear member 30 of the planetary gear device 24 has a cylindrical shape with an internal-toothed ring gear 24r disposed on an inner circumferential surface of an intermediate portion in the axial direction thereof and meshed with the pinions 24p. Flange-shaped fitting portions 90, 92 projecting toward the inner circumferential side are respectively integrally disposed at both end portions of the ring gear member 30 in the axial direction thereof, and these fitting portions 90, 92 are respectively fitted to an outer circumferential surface of cylindrical boss portions 94, 96 integrally disposed on the partition walls 76, 82 concentrically with the first axis S1. The fitting portion 90 is relatively rotatably fitted with respect to the boss portion 94 and is positioned and supported concentrically with the first axis S1, while the fitting portion 92 is spline-fitted to the outer circumferential surface of the boss portion 96 and is non-rotatably held concentrically with the first axis S1. Specifically, spline teeth are respectively disposed on an inner circumferential surface of the fitting portion 92 and the outer circumferential surface of the boss portion 96 so that the portions 92 and 96 are meshed with each other relatively movably in the axial direction of the first axis S1 and relatively non-rotatably around the axis.

The ring gear member 30 has a length dimension set to a shorter dimension than a separation distance between the partition walls 76, 82 and is therefore made movable in the axial direction by a predetermined dimension between the partition walls 76, 82. A twisting direction of a helical gear such as the ring gear 24r is defined such that when the first motor generator MG1 is rotationally driven by the engine 16 via the planetary gear device 24, a thrust load is generated in a direction in which the ring gear member 30 is pressed toward the one intermediate partition wall 82. As a result, the ring gear member 30 is non-rotatably held by the one intermediate partition wall 82, and vibrations in radial, circumferential, and axial directions occurring in the ring gear 24r due to meshing and rotation of the pinions 24p are received by the intermediate partition wall 82. Since the intermediate partition wall 82 is disposed inside the housing case 60, the vibrations applied to the intermediate partition wall 82 are restrained from being emitted as abnormal noises such as gear noises to the outside from the outer cylinder walls 74, 75, 80, etc. of the housing case 60. Since the intermediate partition wall 82 is disposed in a posture substantially parallel to the radial direction of the ring gear 24r, high rigidity is obtained against the vibrations in the radial direction and the circumferential direction, and vibration transmission itself to the intermediate partition wall 82 is suppressed. On the other hand, the vibrations in the radial direction may be applied to the damper partition wall 76 on the opposite side to the partition wall 82 due to fitting of the fitting portion 90 and the boss portion 94; however, the vibrations in the circumferential and axial directions are unlikely to be applied to the damper partition wall 76. Even if the vibrations in the radial direction are applied to the damper partition wall 76, since the damper partition wall 76 is disposed in a posture substantially parallel to the radial direction of the ring gear 24r, high rigidity can be obtained against the vibrations, and the vibrations are unlikely to be emitted as abnormal noises such as gear noises to the outside of the housing case 60.

Figure 3:
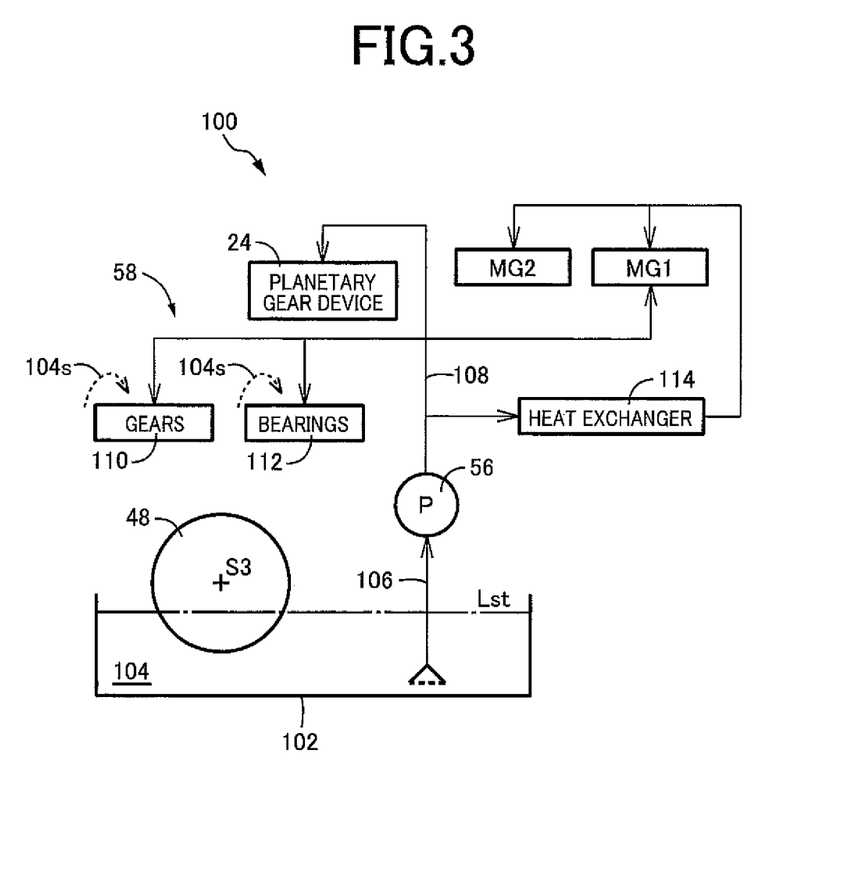
FIG. 3 is a hydraulic circuit diagram of a lubricating device included in the vehicle drive device of FIG. 1.

On the other hand, the vehicle drive device 10 of this example includes a lubricating device 100 shown in FIG. 3. FIG. 3 is a hydraulic circuit diagram for explaining an oil passage of the lubricating device 100. The lubricating device 100 includes the oil pump 56 as a sucking device, sucks an oil 104 from an oil storage portion 102 via a suction oil passage 106, and supplies the oil 104 via supply oil passages 108 to the planetary gear device 24 and gears 110, bearings 112, etc. of the power transmission mechanism 58 for lubrication. The gears 110 are the motor output gear 40, the reduction large gear 32, and the reduction small gear 34, and the bearings 112 are the bearings of the counter shaft 36 and the output shaft 42. The supply oil passages 108 are a pipe provided separately from the housing case 60, oil passages provided inside the housing case 60 and in shaft centers of rotation shafts of portions, etc., and the oil 104 supplied through the supply oil passages 108 is discharged from a nozzle disposed on the pipe, openings communicating with the oil passages, etc., and distributed to the planetary gear device 24, the gears 110, the bearings 112, etc. Additionally, the oil 104 is scattered in the air due to the rotation of the planetary gear device 24, the gears 110, the bearings 112, etc. and used for lubrication of the portions. The oil pump 56 is rotationally driven by the engine 16 or may be arranged to be coupled to a power transmission path to/from the second motor generator MG2 and rotationally driven. An electric oil pump rotationally driven by an electric motor dedicated to the pump may be employed.

A heat exchanger 114 is also disposed on the supply oil passages 108 to cool and supply the oil 104 to the first motor generator MG1 and the second motor generator MG2 so that the motor generators are cooled and prevented from overheating. The heat exchanger 114 is an oil cooler cooling the oil 104 by heat exchange through air cooling or water cooling, for example.

The oil storage portion 102 is made up of the housing case 60 itself, and specifically, a lower end portion of the gear housing space 84 is used as the oil storage portion 102. The third axis S3 disposed with the differential device 48 of the power transmission mechanism 58 is defined at a lowermost position (low position) of the vehicle among the first to fourth axes S1 to S4, and the differential device 48 is at least partially immersed in the oil 104 of the oil storage portion 102. Specifically, an amount etc. of the oil 104 are determined such that in a stationary state in which the operation of the oil pump 56 is stopped during stop of the vehicle 8 so that fluctuation of an oil level stops, a static oil level Lst is higher than the lowermost end position of the differential device 48. Since the differential device 48 is partially immersed in the oil 104 in the oil storage portion 102 as described above, the oil 104 in the oil storage portion 102 is scooped up and scattered to the periphery of the differential device 48 due to the rotation of the differential device 48 when the vehicle 8 is running. A portion of the scattered oil 104s is distributed to the gears 110, the bearings 112, etc. of the power transmission mechanism 58 and used for lubrication thereof. Therefore, the gears 110 and the bearings 112 of the power transmission mechanism 58 are lubricated by both the oil 104 supplied from the supply oil passages 108 by the oil pump 56 and the scattered oil 104s scooped up by the differential device 48. The lubrication may be performed with either one of the oils 104, 104s.

In the lubricating device 100, when the planetary gear device 24 including the ring gear 24r is integrally rotated, a distribution state of the scattered oil 104s scooped up by the differential device 48 and the oil 104 supplied through the supply oil passages 108 to the power transmission mechanism 58 may become unstable due to an air flow generated by the rotation of the planetary gear device 24, and a lubrication performance for the power transmission mechanism 58 may be impaired. In this regard, the vehicle drive device 10 of this example has the carrier 24c of the planetary gear device 24 coupled to the engine 16, the sun gear 24s of the planetary gear device 24 coupled to the first motor generator MG1, and the ring gear 24r of the planetary gear device 24 non-rotatably held by the housing case 60, so that when electric power is generated by the first motor generator MG1, the first motor generator MG1 is rotationally driven by the engine 16 via the carrier 24c and the sun gear 24s. Therefore, the distribution state of the scattered oil 104s scooped up by the differential device 48 and the oil 104 supplied through the supply oil passages 108 to the power transmission mechanism 58 is prevented from becoming unstable due to an air flow generated by the rotation of the planetary gear device 24 as in the case of integrally rotating the planetary gear device 24, and a predetermined lubrication performance is stably obtained.

Since the ring gear 24r positioned at an outermost circumferential portion of the planetary gear device 24 is non-rotatably held by the housing case 60, an air flow generated by the rotation of the sun gear 24s, the pinions 24p, and the carrier 24c disposed on the inner circumferential side relative to the ring gear 24r hardly has an influence, so that the lubrication performance for the power transmission mechanism 58 is more stabilized. Particularly, the ring gear member 30 provided with the ring gear 24r is formed into a cylindrical shape and is arranged to extend between the partition walls 76, 82 located on the both sides of the planetary gear device 24 in the axial direction thereof with the sun gear 24s, the pinions 24p, and the carrier 24c housed inside the ring gear member 30, and therefore, the air flow generated by the rotation of these rotating elements such as the pinions 24p is blocked by the ring gear member 30, so that the lubrication performance for the power transmission mechanism 58 is further stabilized.

The planetary gear device 24 and the power transmission mechanism 58 are arranged on axes different from each other in an at least partially-overlapping positional relationship in the axial direction thereof. Specifically, the planetary gear device 24 is disposed on the first axis S1, while the power transmission mechanism 58 is disposed on the second axis S2 to the fourth axis S4 and the planetary gear device 24 and the power transmission mechanism 58 are housed in the gear housing space 84 to overlap in a substantially entire area in the axial direction. In other words, the power transmission mechanism 58 is substantially entirely disposed on the outer circumferential side of the planetary gear device 24 and is therefore susceptible to the influence of the air flow generated by the rotation of the planetary gear device 24 when the oils 104, 104s are distributed to the power transmission mechanism 58 for lubrication in the case where the planetary gear device 24 including the ring gear 24r is integrally rotated. Since the ring gear 24r of the planetary gear device 24 is held non-rotatably and the influence of the air flow due to the rotation of the planetary gear device 24 is suppressed, so that the lubrication performance is stably obtained when the oils 104, 104s are distributed to the power transmission mechanism 58 for lubrication.

Since the oil storage portion 102 is disposed in the lower end portion of the gear housing space 84 housing the planetary gear device 24 and the power transmission mechanism 58, and the differential device 48 defined as a portion of the power transmission mechanism 58 is immersed in the oil storage portion 102 so that the scattered oil 104s scooped up due to the rotation of the differential device 48 is distributed to the portions of the power transmission mechanism 58, and therefore, when the planetary gear device 24 is integrally rotated, the scattered oil 104s is easily influenced by the air flow generated by the rotation and the distribution state of the oil 104s becomes unstable, so that the lubrication performance may be impaired. In this regard, since the ring gear 24r of the planetary gear device 24 is non-rotatably held and the influence of the air flow due to the rotation of the planetary gear device 24 is suppressed, the distribution state of the scooped-up scattered oil 104s becomes stable so that the lubrication performance is stably obtained when the oils 104, 104s are distributed to the power transmission mechanism 58 for lubrication.

The gear housing space 84 is formed to include the pair of longitudinal walls, or specifically, the partition walls 76, 82, disposed on the both sides of the planetary gear device 24 in the axial direction thereof and the cylindrical gear-portion outer cylinder wall 75 disposed on the outer circumferential side of the planetary gear device 24, and the ring gear member 30 is non-rotatably held by the one intermediate partition wall 82, so that vibrations in the radial and circumferential directions occurring in the ring gear 24r due to meshing and rotation of the pinions 24p are properly received by the intermediate partition wall 82 substantially parallel to the radial direction of the ring gear 24r, and the occurrence of abnormal noises such as gear noises are suppressed as compared to when the ring gear member 30 is fixed to the gear-portion outer cylinder wall 75 etc.

The MG housing space 86 is disposed adjacent to the gear housing space 84 across the intermediate partition wall 82, and the ring gear member 30 is non-rotatably held by the intermediate partition wall 82. Specifically, the ring gear member 30 is non-rotatably held by the intermediate partition wall 82 disposed inside the housing case 60, and therefore, even when vibrations in the radial, circumferential, and axial directions occurring in the ring gear member 30 due to meshing and rotation of the pinions 24p are applied to the intermediate partition wall 82, the vibrations are not transmitted directly to the outside of the housing case 60, so that the occurrence of abnormal noises such as gear noises are suppressed as compared to when the ring gear member 30 is fixed to the gear-portion outer cylinder wall 75 etc.

The ring gear member 30 is fixedly non-rotatably held by the intermediate partition wall 82 via spline fitting, and the ring gear 24r is a helical gear having the twisting direction defined such that a thrust load is generated in the direction in which the ring gear member 30 is pressed toward the intermediate partition wall 82 when the first motor generator MG1 is rotationally driven by the engine 16 via the planetary gear device 24. This can facilitate an operation of installing the ring gear member 30 such that the member 30 is non-rotatably held by the intermediate partition wall 82. Additionally, the load including the thrust load applied to the ring gear member 30 by meshing and rotation of the pinions 24p is received by the intermediate partition wall 82 inside the housing case 60, so that the occurrence of abnormal noises caused by vibrations due to the thrust load is also properly suppressed.

The engine 16, the planetary gear device 24, and the first motor generator MG1 are disposed on the first axis S1, and the second motor generator MG2 is disposed on the second axis S2 and housed in the MG housing space 86 together with the first motor generator MG1, while the power transmission mechanism 58 includes the motor output gear 40 disposed on the second axis S2 and the differential device 48 disposed on the third axis S3, and the whole of the power transmission mechanism 58 from the motor output gear 40 to the differential device 48 is housed in the gear housing space 84. Therefore, the vehicle drive device 10 including the differential device 48 can be formed compact in terms of the dimension in the axial direction of the first axis S1, and when the vehicle drive device 10 is mounted on the vehicle 8 in a transversely-mounted posture in which the first axis S1 is substantially parallel to the width direction of the vehicle 8, the vehicle width dimension can be kept relatively small.

The engine 16, the planetary gear device 24, and the first motor generator MG1 are disposed in this order on the common first axis S1, and the housing case 60 is formed to include the intermediate case member 64, the housing 62, and the rear cover 66, and this can facilitate operations of assembling the planetary gear device 24 and the power transmission mechanism 58 in the gear housing space 84 between the intermediate partition wall 82 of the intermediate case member 64 and the housing 62 and assembling the ring gear member 30 such that the member 30 is non-rotatably held by the intermediate partition wall 82. This can also facilitate an operation of assembling the motor generators MG1, MG2 in the MG housing space 86 between the intermediate partition wall 82 of the intermediate case member 64 and the rear cover 66.

Other examples of the present invention will be described. In the following examples, portions substantially the same as those of the example are denoted by the same reference numerals and will not be described in detail.

Figure 4:
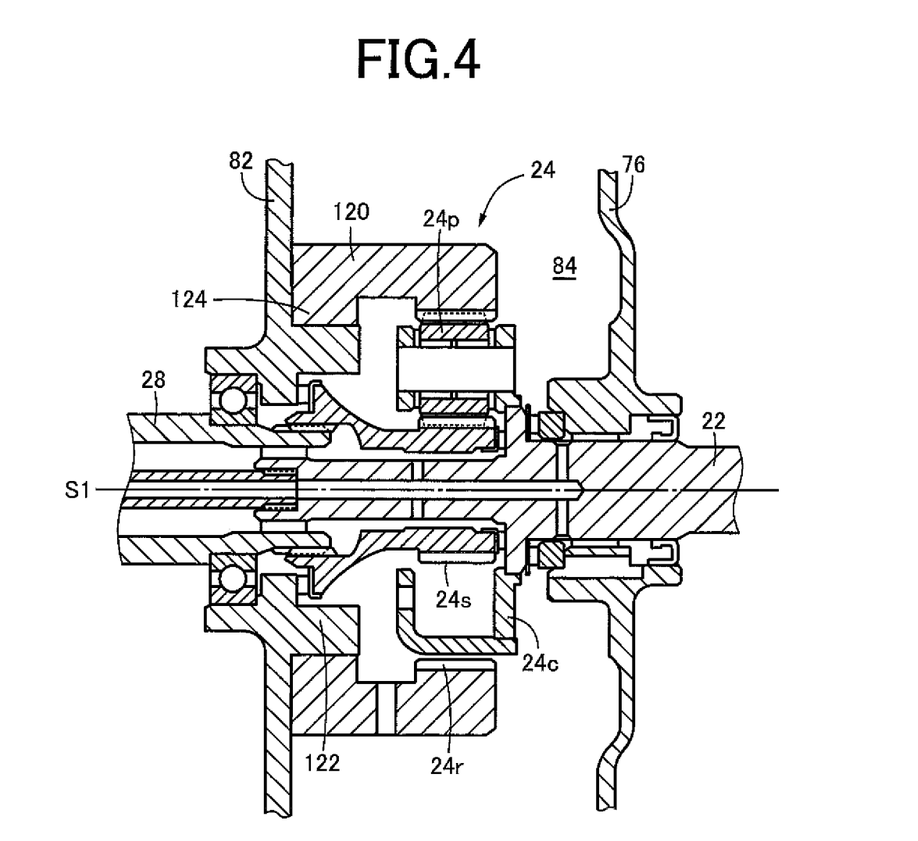
FIG. 4 is a view for explaining another form in which a ring gear member of the planetary gear device is non-rotatably held by a housing case and is a cross-sectional view corresponding to FIG. 2.

FIG. 4 is a cross-sectional view corresponding to FIG. 2 described above, and a ring gear member 120 of the planetary gear device 24 in this example of FIG. 4 is different from that in the example of FIG. 2. Specifically, the ring gear member 120 is integrally press-fitted to the outer circumferential side of a cylindrical boss portion 122 disposed on the intermediate partition wall 82 concentrically with the first axis S1 and is non-rotatably held by the intermediate partition wall 82 in a cantilevered manner. The ring gear member 120 has a cylindrical shape, and the ring gear 24r is formed on the inner circumferential side of one end portion of the ring gear member 130 in an axial direction thereof, while a press-fitted fitting portion 124 press-fitted to the outer circumferential side of the boss portion 122 is formed on the inner circumferential side of the other end portion in the axial direction. Even in this case, substantially the same effects can be obtained as in the above-described example.

Figure 5:
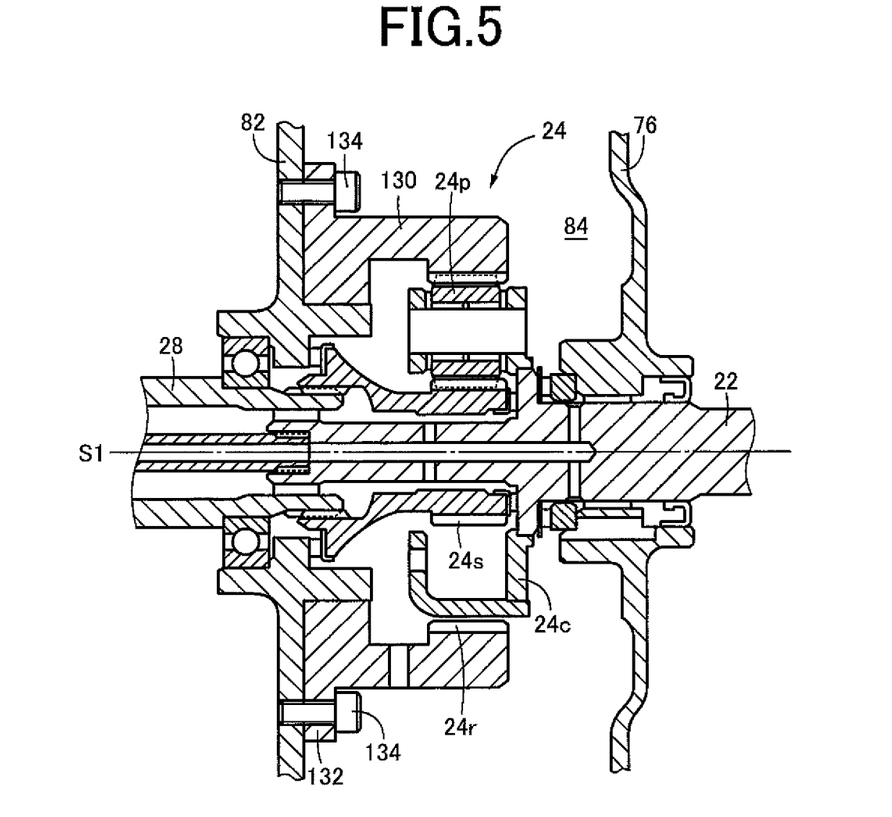
FIG. 5 is a view for explaining still another form in which a ring gear member of the planetary gear device is non-rotatably held by a housing case and is a cross-sectional view corresponding to FIG. 2.

A ring gear member 130 of FIG. 5 is non-rotatably held by the intermediate partition wall 82 in a cantilevered manner as with the ring gear member 120, includes a circular ring-shaped flange 132 extending to the outer circumferential side from an end portion of the ring gear member 130 close to the intermediate partition wall 82, and is integrally fixed to the intermediate partition wall 82 via the flange 132 by a plurality of bolts 134. Even in this case, the same effects can be obtained as in the above-described example.

In the examples of FIGS. 4 and 5, as with the ring gear member 30, the length dimension of the ring gear member 130 may be set to reach the vicinity of the damper partition wall 76 on the opposite side to the intermediate partition wall 82, while the fitting portion 92 fitted to the boss portion 94 of the damper partition wall 76 may be provided, so that the ring gear member 120, 130 is positioned concentrically with the first axis S1 and rotatably supported by the damper partition wall 76. Alternatively, the ring gear members 120, 130 including the ring gear member 30 may non-rotatably be held also with respect to the damper partition wall 76 by spline fitting, press fitting, bolt fastening, etc. The ring gear members 30, 120, 130 may be positioned concentrically with the first axis S1 by the intermediate partition wall 82 and rotatably held by the damper partition wall 76.

Although the examples of the present invention have been described in detail with reference to the drawings, these are merely an embodiment, and the present invention can be implemented in variously modified and improved forms based on the knowledge of those skilled in the art.

REFERENCE SIGNS LIST

10: vehicle drive device 16: engine 24: planetary gear device 24s: sun gear 24c: carrier 24r: ring gear 30, 12, 130: ring gear member 40: motor output gear 48: differential device 54: wheels 58: power transmission mechanism 60: housing case 62: housing (engine-side case member) 64: intermediate case member 66: rear cover (generator-side case member) 75: gear-portion outer cylinder wall (first outer cylinder wall) 76: damper partition wall (longitudinal wall) 80: MG-portion outer cylinder wall (second outer cylinder wall) 82: intermediate partition wall (longitudinal wall) 84: gear housing space (first housing space) 86: MG housing space (second housing space) 100: lubricating device 102: oil storage portion 104: oil 104s: scattered oil MG1: first motor generator (generator) MG2: second motor generator (electric motor) S1 to S4: first to fourth axes

What is claimed is:

1. A vehicle drive device including
a generator rotationally driven to generate electric power by an engine via a planetary gear device,
an electric motor operated by using an electric energy obtained by the generator, and
a power transmission mechanism transmitting an output of the electric motor to wheels,
the vehicle drive device comprising:
a housing case including a first housing space; and
a lubricating device distributing an oil at least to the power transmission mechanism in the first housing space for lubrication, wherein
the planetary gear device and the power transmission mechanism are housed in the first housing space and
a sun gear and a carrier of the planetary gear device are coupled to one and the other of the engine and the generator respectively, while a ring gear of the planetary gear device is non-rotatably held by the housing case.

2. The vehicle drive device according to claim 1, wherein the planetary gear device and the power transmission mechanism are arranged on axes different from each other and overlap at least partially each other in the axial direction.

3. The vehicle drive device according to claim 1, wherein the lubricating device includes an oil storage portion disposed in a lower end portion of the first housing space, and wherein
the power transmission mechanism is partially immersed in an oil stored in the oil storage portion, so that the oil scooped up due to rotation of the power transmission mechanism is scattered and distributed to portions of the power transmission mechanism.

4. The vehicle drive device according to claim 1, wherein the housing case includes a pair of longitudinal walls disposed at both sides in an axial direction of the planetary gear device to intersect with the axial direction and a cylindrical first outer cylinder wall disposed on an outer circumferential side of the planetary gear device and thereby forms the first housing space, and wherein
the ring gear is non-rotatably held by either one or both of the pair of vertical walls.

5. The vehicle drive device according to claim 1, wherein the housing case includes a second housing space disposed adjacent to the first housing space across an intermediate partition wall, wherein
the generator is housed in the second housing space, and wherein the ring gear is non-rotatably held by the intermediate partition wall.

6. The vehicle drive device according to claim 5, wherein
a ring gear member on which the ring gear is provided is fixedly non-rotatably held by the intermediate partition wall with spline fitting, wherein
the ring gear is a helical gear, and wherein
the helical gear has a twisting direction defined such that a thrust load is generated in a direction in which the ring gear member is pressed toward the intermediate partition wall when the generator is rotationally driven by the engine via the planetary gear device.

7. The vehicle drive device according to claim 5, wherein
the engine, the planetary gear device, and the generator are disposed on a first axis, wherein
the electric motor is disposed on a second axis parallel to the first axis and housed in the second housing space together with the generator, wherein
the power transmission mechanism includes a motor output gear disposed on the second axis and rotationally driven by the electric motor and a differential device disposed on a third axis parallel to the second axis, wherein the whole of the power transmission mechanism from the motor output gear to the differential device is housed in the first housing space, and wherein
the vehicle drive device is mounted on a vehicle in a posture in which the first axis is substantially parallel to a width direction of the vehicle.

8. The vehicle drive device according to according to claim 5, wherein
the engine, the planetary gear device, and the generator are disposed on a common axis and the planetary gear device is located between the engine and the generator, wherein
the housing case includes
an intermediate case member including a cylindrical second outer cylinder wall and provided with the intermediate partition wall extending from the second outer cylinder wall to the inner circumferential side,
an engine-side case member integrally fixed to one end portion of the second outer cylinder wall and integrally fixed to the engine to form the first housing space with the intermediate partition wall, and
a generator-side case member integrally fixed to the other end portion of the second outer cylinder wall to form the second housing space with the intermediate partition wall.

* * * * *